US012040984B2

(12) United States Patent
Barman et al.

(10) Patent No.: US 12,040,984 B2
(45) Date of Patent: *Jul. 16, 2024

(54) PROACTIVE AND ON-DEMAND DESTINATION NEXT HOP INFORMATION SHARING MECHANISM BETWEEN A FORWARDING PLANE AND A SERVICE PLANE

(71) Applicant: Juniper Networks, Inc., Sunnyvale, CA (US)

(72) Inventors: Dipankar Barman, Bangalore (IN); Girish Kumar Attimgere Lingaiah, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/814,926

(22) Filed: Jul. 26, 2022

(65) Prior Publication Data

US 2022/0360535 A1    Nov. 10, 2022

Related U.S. Application Data

(63) Continuation of application No. 17/103,183, filed on Nov. 24, 2020, now Pat. No. 11,411,873.

(51) Int. Cl.
| | | |
|---|---|---|
| *H04L 47/2425* | (2022.01) | |
| *H04L 43/028* | (2022.01) | |
| *H04L 45/745* | (2022.01) | |
| *H04L 47/2483* | (2022.01) | |
| *H04L 69/22* | (2022.01) | |

(52) U.S. Cl.
CPC ........ *H04L 47/2425* (2013.01); *H04L 45/745* (2013.01); *H04L 47/2483* (2013.01); *H04L 69/22* (2013.01); *H04L 43/028* (2013.01)

(58) Field of Classification Search
CPC ......... H04L 45/38; H04L 45/50; H04L 45/74; H04L 45/745; H04L 45/306; H04L 69/22; H04L 47/24; H04L 47/2425; H04L 47/2433; H04L 47/2483; H04L 43/02; H04L 43/026; H04L 43/028; H04L 43/20;
(Continued)

(56) References Cited

U.S. PATENT DOCUMENTS

| | | |
|---|---|---|
| 8,339,959 B1 | 12/2012 | Moisand et al. |
| 8,498,295 B1 | 7/2013 | Saxena et al. |

(Continued)

*Primary Examiner* — Peter Chen
(74) *Attorney, Agent, or Firm* — Harrity & Harrity, LLP

(57) ABSTRACT

A first packet forwarding plane (PFE) of a network device may receive a packet and may perform a first lookup for the packet. The first PFE may provide the packet to a service plane based on the first lookup. The service plane may apply a service to the packet and may provide the packet to the first PFE. The first PFE may perform a second lookup. The first PFE may provide the packet to a second PFE of the network device based on the second lookup and may store flow information associated with the packet and second PFE information in a table. The network device may provide the flow information and the second PFE information from the table to the service plane to cause the service plane to send subsequent packets directly to the second PFE thereby saving fabric, memory, and processing bandwidth and improving overall network performance.

20 Claims, 10 Drawing Sheets

(58) Field of Classification Search
CPC ....... H04L 67/02; H04L 67/55; H04L 67/563; H04W 24/08; H04W 28/02
See application file for complete search history.

(56) References Cited

U.S. PATENT DOCUMENTS

| | | | |
|---|---|---|---|
| 8,615,009 B1* | 12/2013 | Ramamoorthi | H04L 69/22 |
| | | | 370/389 |
| 11,411,873 B1 | 8/2022 | Barman et al. | |
| 2015/0244590 A1 | 8/2015 | Lin et al. | |
| 2015/0358243 A1 | 12/2015 | Konduru et al. | |
| 2016/0255002 A1* | 9/2016 | Pitchai | H04L 45/745 |
| | | | 370/392 |
| 2018/0091424 A1* | 3/2018 | Jalil | H04L 45/30 |

* cited by examiner

US 12,040,984 B2

PROACTIVE AND ON-DEMAND DESTINATION NEXT HOP INFORMATION SHARING MECHANISM BETWEEN A FORWARDING PLANE AND A SERVICE PLANE

RELATED APPLICATION

This application is a continuation of U.S. patent application Ser. No. 17/103,183, filed Nov. 24, 2020 (now U.S. Pat. No. 11,411,873), which is incorporated herein by reference in its entirety.

BACKGROUND

For service packet forwarding, a network device creates a flow and retains flow state in a service plane and bidirectional traffic should arrive in a fixed central processing unit (CPU) core of the network device.

SUMMARY

In some implementations, a method may include receiving, by a first packet forwarding plane of a network device, a packet, and performing, by the first packet forwarding plane, a first lookup for the packet. The method may include providing, by the first packet forwarding plane, the packet to a service plane of the network device based on the first lookup, and applying, by the service plane, a service to the packet to generate a serviced packet. The method may include providing, by the service plane, the serviced packet to the first packet forwarding plane, and performing, by the first packet forwarding plane, a second lookup for the serviced packet. The method may include providing, by the first packet forwarding plane, the serviced packet to a second packet forwarding plane of the network device based on the second lookup, and storing, by the first packet forwarding plane, flow information associated with the packet in a table of the network device. The method may include providing the flow information from the table to the service plane.

In some implementations, a network device may include one or more memories, and one or more processors to receive, by a first packet forwarding plane of the network device, a packet, and perform, by the first packet forwarding plane, a first lookup for the packet. The one or more processors may provide, by the first packet forwarding plane, the packet to a service plane of the network device based on the first lookup, and may apply, by the service plane, a service to the packet to generate a serviced packet. The one or more processors may provide, by the service plane, the serviced packet to the first packet forwarding plane, and may perform, by the first packet forwarding plane, a second lookup for the serviced packet. The one or more processors may provide, by the first packet forwarding plane, the serviced packet to a second packet forwarding plane of the network device based on the second lookup, and may store, by the first packet forwarding plane, flow information associated with the packet in a table of the network device. The one or more processors may provide the flow information from the table to the service plane, and may transmit, by the second packet forwarding plane, the serviced packet toward a destination associated with the serviced packet.

In some implementations, a non-transitory computer-readable medium may store a set of instructions that includes one or more instructions that, when executed by one or more processors of a network device, cause the network device to receive, by a first packet forwarding plane of the network device, a packet, and perform, by the first packet forwarding plane, a first lookup for the packet. The one or more instructions may cause the network device to provide, by the first packet forwarding plane, the packet to a service plane of the network device based on the first lookup, and apply, by the service plane, a service to the packet to generate a serviced packet. The one or more instructions may cause the network device to provide, by the service plane, the serviced packet to the first packet forwarding plane, and perform, by the first packet forwarding plane, a second lookup for the serviced packet. The one or more instructions may cause the network device to provide, by the first packet forwarding plane, the serviced packet to a second packet forwarding plane of the network device based on the second lookup, and provide, by the first packet forwarding plane, flow information associated with the packet to the service plane. The one or more instructions may cause the network device to receive, by the first packet forwarding plane, another packet associated with the flow information, and perform, by the first packet forwarding plane, a third lookup for the other packet. The one or more instructions may cause the network device to provide, by the first packet forwarding plane, the other packet to the service plane based on the third lookup, and apply, by the service plane, another service to the other packet to generate another serviced packet. The one or more instructions may cause the network device to provide, by the service plane, the other serviced packet to the second packet forwarding plane based on the flow information.

DETAILED DESCRIPTION

Figure 1A:
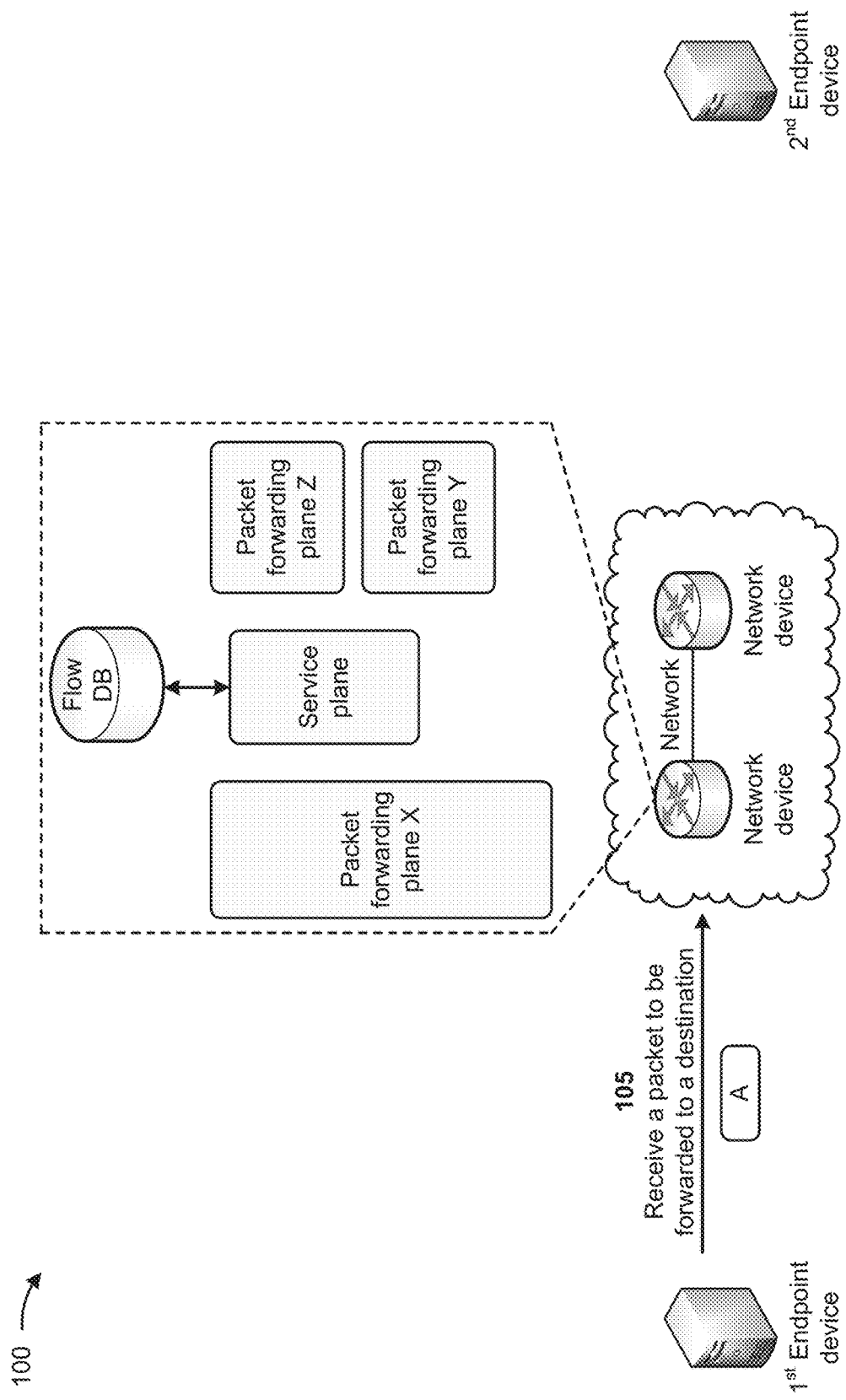
FIGS. 1A-1F are diagrams of an example implementation described herein.

The following detailed description of example implementations refers to the accompanying drawings. The same reference numbers in different drawings may identify the same or similar elements.

A distributed routing system of a network device may include multiple packet forwarding planes internally connected via a fabric plane in addition to a connection with different destination next hops via a wide area network (WAN). The packet forwarding planes send traffic to a service plane for advanced traffic processing (e.g., deep packet inspection, Internet protocol security, and/or the like). After a service is applied by the service plane, the traffic may return to a source packet forwarding plane. The source packet forwarding plane performs route lookup and may send, via the fabric plane, the packet to another packet forwarding plane, which is connected to destination next hop via a WAN interface. This extra fabric plane hop increases traffic load on the fabric plane of the network device and degrades traffic performance in the distributed routing system of the network device.

In some cases, the WAN interface is an aggregate interface and child links are hosted in different packet forwarding planes. In these cases, after the service is applied, because traffic distribution logic for the aggregate interface is embedded to the packet forwarding plane, the service plane is unable to determine to which interface and packet forwarding plane packets of a specific flow are to be transmitted. Additionally, in some cases further protocol processing (e.g., generic routing encapsulation (GRE)/IP-IP tunneling) is required, and traffic may need to be forwarded to another packet forwarding plane where a protocol processing plane is hosted. The service plane is unable to forward the traffic to the other packet forwarding plane directly, because the service plane is unable to perform a route lookup and depends on the packet forwarding plane for the route lookup.

Thus, current techniques for service packet forwarding waste computing resources (e.g., processing resources, memory resources, communication resources, and/or the like), networking resources, and/or the like associated with performing extra fabric plane hops with the network device, determining routes for serviced packets, and/or the like.

Some implementations described herein relate to a network device that provides a proactive and on-demand destination next hop information sharing mechanism between a forwarding plane and a service plane. For example, a first packet forwarding plane of a network device may receive a packet and may perform a first lookup for the packet. The first packet forwarding plane may provide the packet to a service plane of the network device based on the first lookup, and the service plane may apply a service to the packet to generate a serviced packet. The service plane may provide the serviced packet to the first packet forwarding plane, and the first packet forwarding plane may perform a second lookup for the serviced packet. The first packet forwarding plane may provide the serviced packet to a second packet forwarding plane of the network device based on the second lookup and may store flow information associated with the packet in a table of the network device. The first packet forwarding plane may provide the flow information from the table to the service plane.

In this way, the network device may provide a proactive and on-demand destination next hop information sharing mechanism between a forwarding plane and a service plane. For example, the network device may proactively learn packet forwarding plane information and may provide the packet forwarding plane information to a service plane of the network device. Packets from the service plane may include a flow identifier and a service plane identifier, and, if a new destination packet forwarding plane is determined, the network device may store this information in a hash table after an original packet is provided to the WAN interface. The packet forwarding plane may continuously walk the hash table, may store multiple sessions and flow information, and may provide the information to the service plane in a single control packet via the same fabric channel used by service packets. The service plane may process the control packet and may utilize the information to provide subsequent packets associated with a same flow directly to the new destination packet forwarding plane thereby eliminating a fabric hop. This, in turn, conserves computing resources, networking resources, and/or the like that would otherwise have been wasted in performing extra fabric hops with the network device, determining routes for serviced packets, and/or the like.

FIGS. 1A-1F are diagrams of one or more example implementations 100 described herein. FIGS. 1A-1D are diagrams of an example implementation related to proactive destination forwarding plane information learning. The service plane may receive updated destination packet forwarding plane information based on notification messages provided by a source packet forwarding plane, as described in greater detail below.

As shown in FIG. 1A, a network may include multiple network devices and may be associated with endpoint devices. The network may include one or more wired and/or wireless networks. Each network device may include a device capable of receiving, processing, storing, routing, and/or providing traffic (e.g., a packet, other information or metadata, and/or the like) in a manner described herein. For example, a network device may include a router, a switch, a gateway, a firewall, a hub, a bridge, a reverse proxy, a server, a load balancer, and/or the like. Each endpoint device may include a client device (e.g., a mobile phone, a laptop computer, a tablet computer, a desktop computer, and/or the like), a server device, and/or the like.

As shown in FIG. 1A, and by reference number 105, the network device receives, from a first endpoint device, a packet to be forwarded to a destination (e.g., a second endpoint device, as shown in FIG. 1A). The first endpoint device and the second endpoint device may be connected via a network that includes the network device. The first endpoint device may transmit the packet to the second endpoint device via the network. The network device may receive the packet based on the first endpoint device transmitting the packet to the second endpoint device via the network.

Figure 1B:
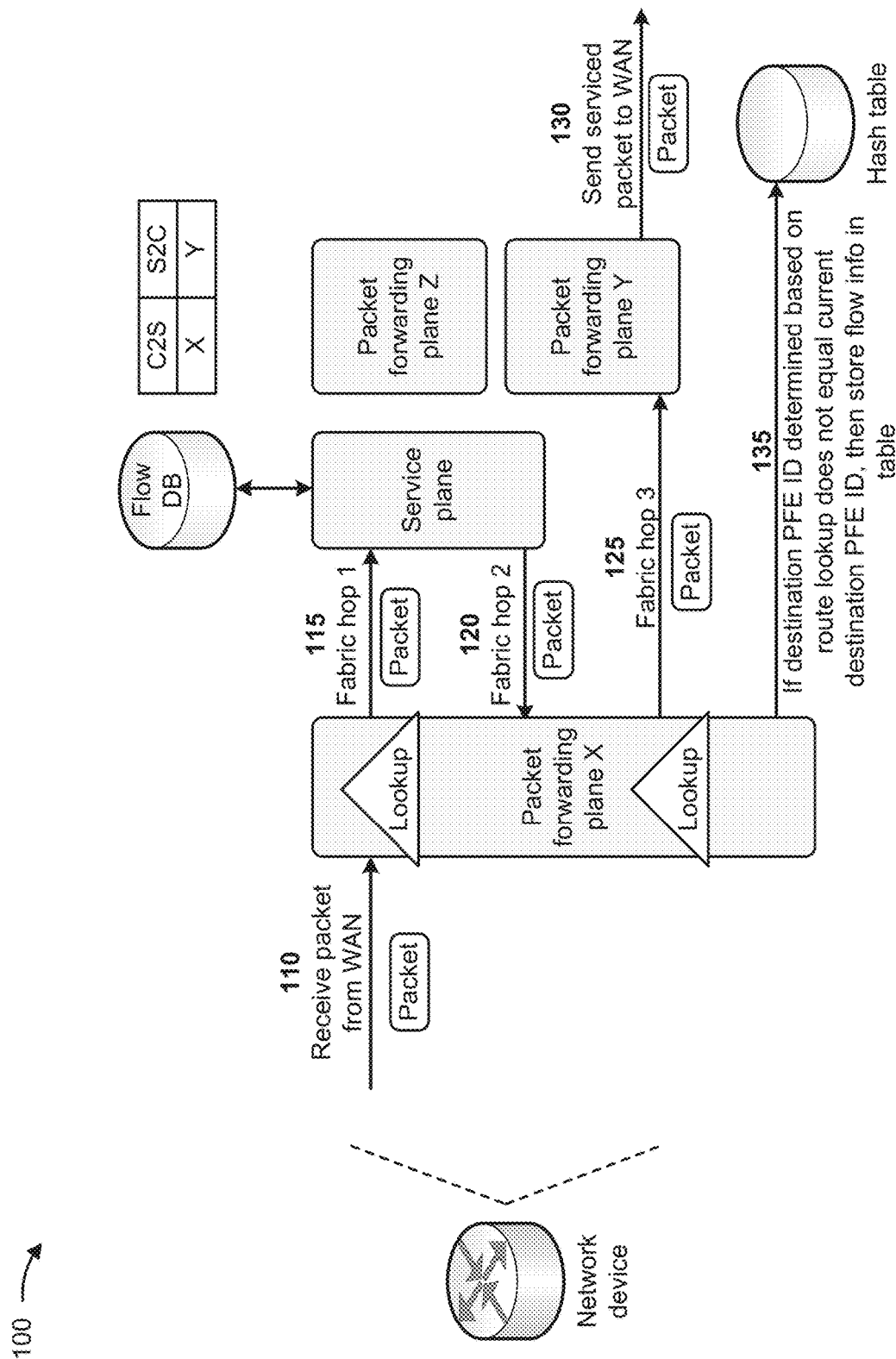

In some implementations, the network includes a wide area network (WAN). As shown in FIG. 1B, and by reference number 110, a first packet forwarding plane (e.g., packet forwarding plane X, as shown in FIG. 1B) of the network device receives the packet from the WAN. The network device may include a distributed routing system that has a plurality of packet forwarding planes and/or a plurality of service planes interconnected via a fabric plane. The first packet forwarding plane may determine a destination associated with the packet based on information included in a header of the packet. The first packet forwarding plane may utilize a routing table to perform a route lookup for the packet. The first packet forwarding plane may determine to forward the packet to a service plane of the network device based on performing the route lookup.

As shown by reference number 115, the first packet forwarding plane provides the packet to a service plane of the network device via a fabric plane of the network device. In some implementations, the first packet forwarding plane may add a header to the packet and may provide the packet and the header to the service plane. The header may include information identifying the first packet forwarding plane as the source packet forwarding plane.

The service plane may receive the packet via the fabric plane. The service plane may apply a service to the packet to generate a serviced packet based on receiving the packet from the first packet forwarding plane. For example, the service plane may perform deep packet inspection (DPI), Internet protocol security (IPsec) processing, and/or the like.

In some implementations, the service plane monitors a session associated with the packet. The session may be associated with an uplink flow (e.g., a flow associated with packets transmitted from the first endpoint device to the second endpoint device (e.g., C2S, as shown in FIG. 1B)) and a downlink flow (e.g., a flow associated with packets transmitted from the second endpoint device to the first endpoint device (e.g., S2C, as shown in FIG. 1B)). The service plane may create the uplink flow based on receiving the packet from the first packet forwarding plane.

The service plane may track a destination packet forwarding plane (e.g., the packet forwarding plane to which the service plane forwards a serviced packet) for each flow. The service plane may determine a source packet forwarding plane from which the packet is received (e.g., the first packet forwarding plane) based on creating the uplink flow (e.g., based on the packet being the first packet associated with the uplink flow that is received by the service plane). The service plane may determine the source packet forwarding plane based on information included in the header of the packet (e.g., information identifying the first packet forwarding plane). For example, the service plane may determine the source packet forwarding plane based on information that was added to the packet in the form of a header, as described above. The service plane may identify the source packet forwarding plane as the current destination packet forwarding plane.

The service plane may store flow information associated with the packet in a data structure (e.g., a database, a table, a list, and/or the like). For example, as shown in FIG. 1B, the service plane may store the flow information in a flow database. The flow information may include a session identifier, information identifying the uplink flow (e.g., a flow identifier), information identifying a current destination packet forwarding plane (e.g., a packet forwarding plane identifier (PFE ID) associated with the first packet forwarding plane), information identifying the service plane, and/or the like.

As shown by reference number 120, the service plane provides the serviced packet to the first packet forwarding plane via the fabric plane. The serviced packet may include one or more portions of the flow information associated with the packet. For example, the serviced packet may include information identifying the uplink flow, information identifying the service plane, and/or information identifying the current destination packet forwarding plane (e.g., the first packet forwarding plane) in a header of the serviced packet.

As shown by reference number 125, the first packet forwarding plane provides the serviced packet to a second packet forwarding plane (e.g., packet forwarding plane Y, as shown in FIG. 1B) via the fabric plane. The first packet forwarding plane may perform a route lookup to determine a destination to which the serviced packet is to be forwarded based on receiving the serviced packet from the service plane. For example, the first packet forwarding plane may determine to provide the serviced packet to the packet forwarding plane Y based on accessing a data structure storing routing information associated with the serviced packet.

As shown by reference number 130, the second packet forwarding plane sends the serviced packet to the WAN. The second packet forwarding plane may send the serviced packet to the WAN to forward the serviced packet towards the destination associated with the service packet (e.g., the second endpoint device).

As shown by reference number 135, the first packet forwarding plane determines if the destination packet forwarding plane determined based on performing the route lookup for the serviced packet is different from the current destination packet forwarding plane and, if so, the first packet forwarding plane stores flow information associated with the serviced packet in a table (e.g., a hash table, as shown in FIG. 1B). For example, the packet forwarding plane may determine that the second packet forwarding plane, determined based on performing the route lookup for the serviced packet, is different from the first packet forwarding plane (e.g., the current destination packet forwarding plane) identified in the information included in the serviced packet. The first packet forwarding plane may store flow information with the serviced packet in the hash table. The flow information may include information identifying a session associated with the serviced packet, information identifying the uplink flow associated with the serviced packet, information identifying the second packet forwarding plane (e.g., packet forwarding plane Y) as the current destination packet forwarding plane, information identifying the service plane, and/or the like. In some implementations, the first packet forwarding plane may generate a hash based on the flow information and may store the record as an entry in the hash table. In a separate processing thread, the first packet forwarding plane may read the hash table and may bulk all the flow information indicating a destination packet forwarding plane that is different from the current destination packet forwarding plane in a single message that is periodically sent to the service plane. The service plane may update the flow information for the serviced packet based on the information provided by the first packet forwarding plane, as described in greater detail below.

Figure 1C:
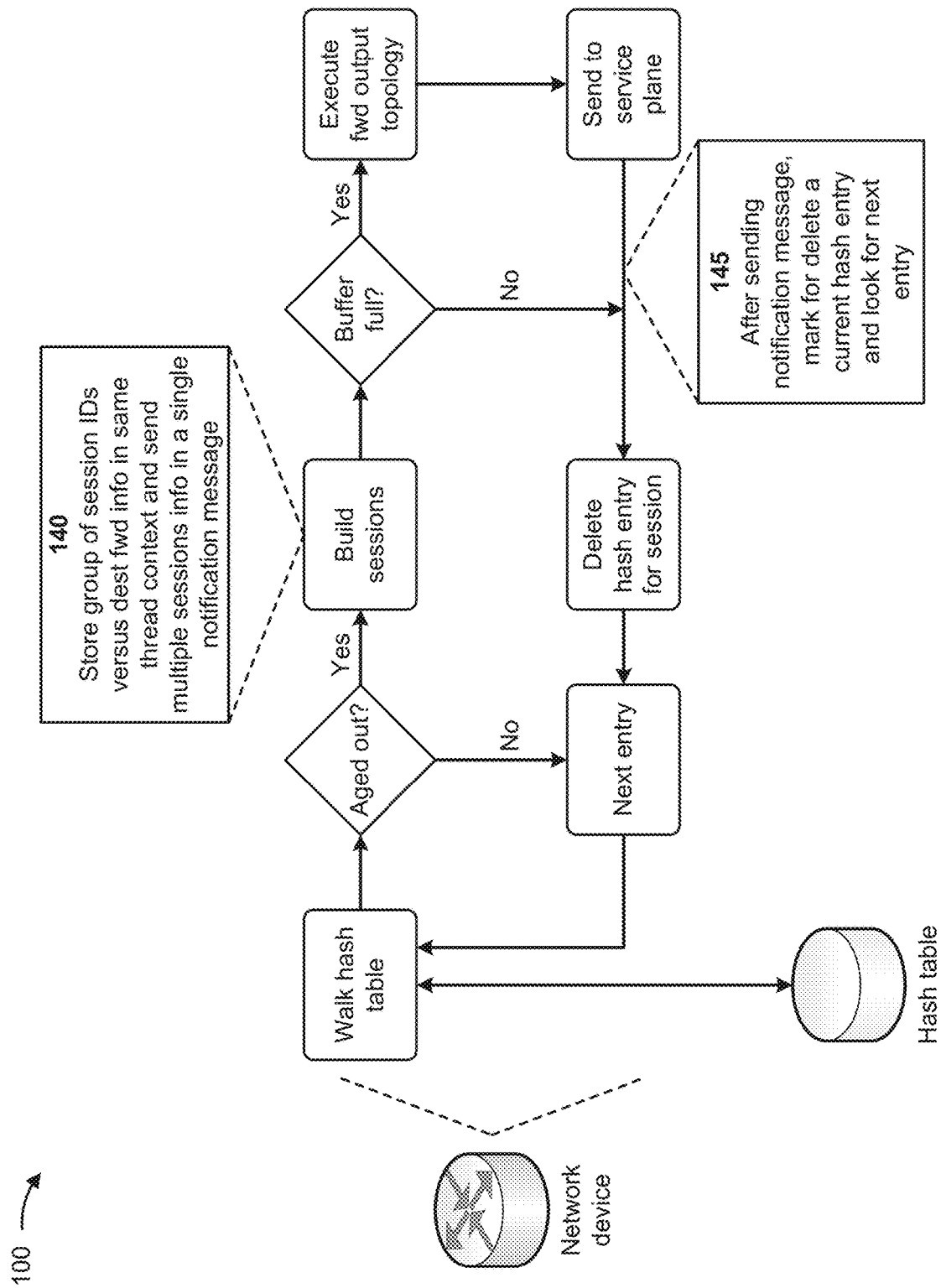

FIG. 1C is a diagram of a process for providing updated destination packet forwarding plane information to the service plane. The first packet forwarding plane may monitor information stored in the hash table to identify entries associated with the service plane. For example, a hardware thread in the first packet forwarding plane may continuously walk the hash table to identify entries associated with the service plane. The first packet forwarding plane may store the identified entries in a buffer. Each entry may include information identifying a flow and a destination packet forwarding plane associated with the flow. The first packet forwarding plane may provide a notification message to the service plane that includes the entries stored in the buffer.

As shown in FIG. 1C, and by reference number 140, the first packet forwarding plane stores a group of session identifiers in associations with respective destination packet forwarding plane information in a same thread context and sends multiple sessions information in a single notification message to the service plane. The first packet forwarding plane may provide the notification message to the service plane based on the buffer being full, based on identifying a particular quantity of entries, based on an expiration of a time period, based on determining that each entry associated with the service plane has been identified and stored in the buffer, and/or the like.

The service plane may receive the notification message from the first packet forwarding plane. The service plane may determine a destination packet forwarding plane (e.g., the second packet forwarding plane) associated with the uplink flow associated with the packet based on the entries included in the message. The service plane may determine that the destination packet forwarding plane identified in the notification message is different from the destination packet forwarding plane identified in the flow information associated with the serviced packet and stored in the data structure. The service plane may update the flow information associated with the serviced packet to identify the second packet forwarding plane as the destination packet forwarding plane. Thus, updated information may be used by the service plane for forwarding the subsequent packet for the uplink flow to the destination packet forwarding plane identified by the information stored in the data structure. In this way, the network device may provide a proactive and on-demand destination next hop information sharing mechanism between a forwarding plane and a service plane.

As shown by reference number 145, after sending the notification message, the first packet forwarding plane marks the current hash entry (e.g., each entry included in the notification message provided to the service plane) for deletion and looks for a next entry in the hash table. The first packet forwarding plane may delete the entries marked for deletion. The first packet forwarding plane may process each entry stored in the hash table and may provide notification messages to each service plane of the network device in a manner similar to that described above.

Figure 1D:
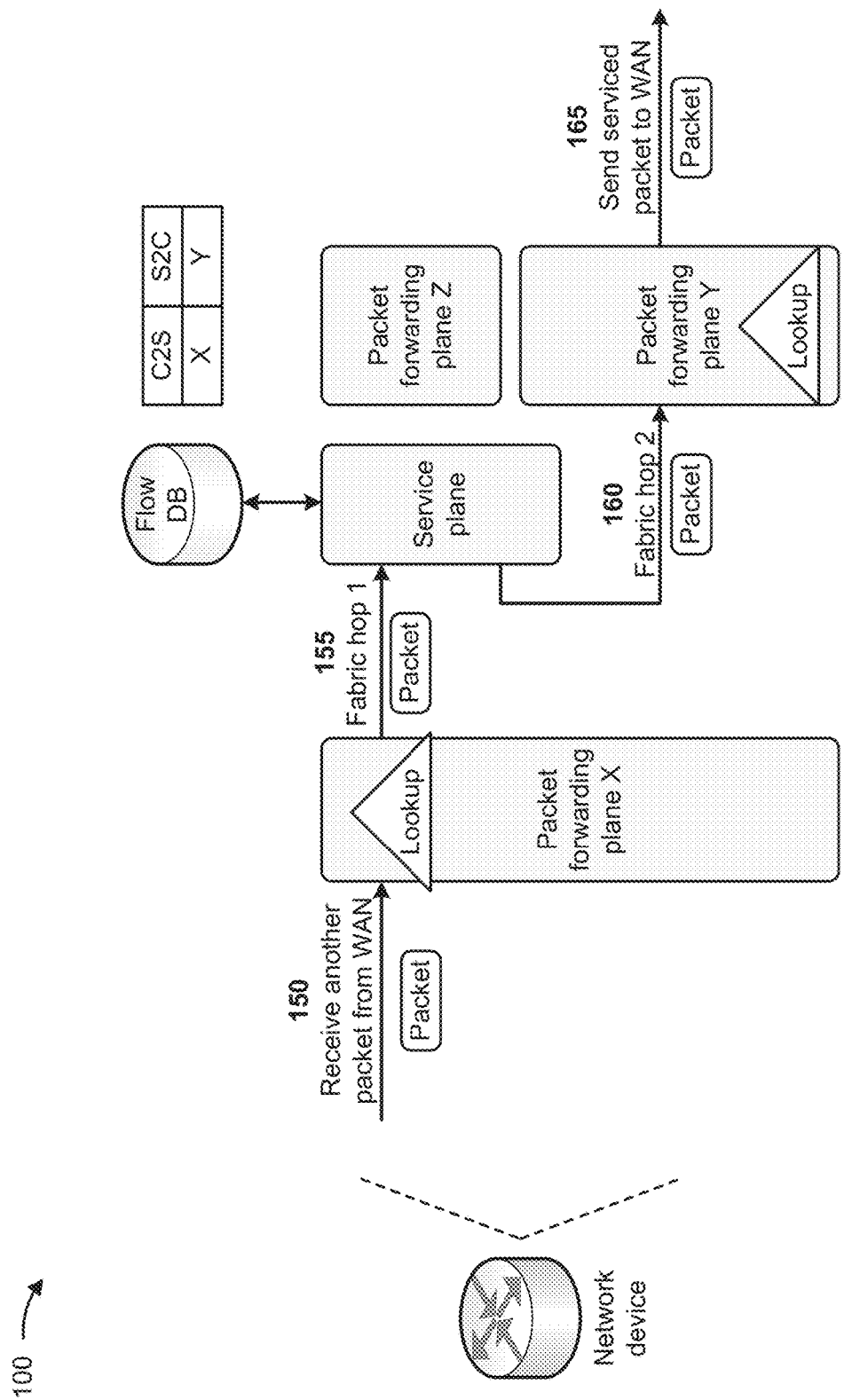

As shown in FIG. 1D, and by reference number 150, the first packet forwarding plane may receive another packet from the WAN. The first packet forwarding plane may perform a route lookup operation based on receiving the other packet from the WAN. The first packet forwarding plane may determine to provide the other packet to the service plane based on performing the route lookup operation.

As shown by reference number 155, the first packet forwarding plane forwards the other packet to the service plane via the fabric plane. The service plane may receive the other packet and may perform a service based on receiving the other packet. The service plane may identify a flow associated with the other packet. For example, the service plane may determine the flow associated with the other packet based on information (e.g., a session identifier associated with a session associated with the other packet, a source address associated with the other packet, a destination address associated with the other packet, and/or the like) included in a header of the other packet. In the service plane, the optimized packet forwarding plane (in this case, the second packet forwarding plane) has already been learned by the service plane. Therefore, the other packet for the same flow will be directly sent to the optimized packet forwarding plane after the service is applied to the other packet. Thus, updated information may be used by the service plane for forwarding the subsequent packet for the uplink flow to the destination packet forwarding plane identified by the information stored in the data structure, as described above.

As shown by reference number 160, the service plane forwards the other packet to the second packet forwarding plane (e.g., packet forwarding plane Y, as shown in FIG. 1D) based on servicing the other packet. In this way, the service plane conserves computing resources (e.g., processing resources, memory resources, communication resources, and/or the like), networking resources, and/or the like that otherwise would have been wasted in performing extra fabric hops (e.g., providing the other packet to the first packet forwarding plane and the first packet forwarding plane providing the other packet to the second packet forwarding plane).

As shown by reference number 165, the second packet forwarding plane sends the serviced other packet to the WAN to forward the serviced other packet towards a destination (e.g., the second endpoint device). For example, the second packet forwarding plane may perform a route lookup operation based on receiving the other packet from the service plane. The second packet forwarding plane may forward the other packet toward the second endpoint device via the WAN based on performing the route lookup operation.

In this way, the network device may provide a proactive destination next hop information sharing mechanism between a forwarding plane and a service plane. For example, the network device may proactively learn packet forwarding plane information and may provide the packet forwarding plane information to a service plane of the network device. Packets from the service plane may include a flow identifier and a service plane identifier, and, if a new destination packet forwarding plane is determined, the network device may store this information in a hash table after an original packet is provided to the WAN interface. The packet forwarding plane may continuously walk the hash table, may store multiple sessions and flow information, and may provide the information to the service plane in a single message. The service plane may utilize the information to provide subsequent packets associated with a same flow directly to the new destination packet forwarding plane thereby eliminating a fabric hop. This, in turn, conserves computing resources (e.g., processing resources, memory resources, communication resources, and/or the like), networking resources, and/or the like that would otherwise have been wasted in performing extra fabric hops with the network device, determining routes for serviced packets, and/or the like.

Figure 1E:
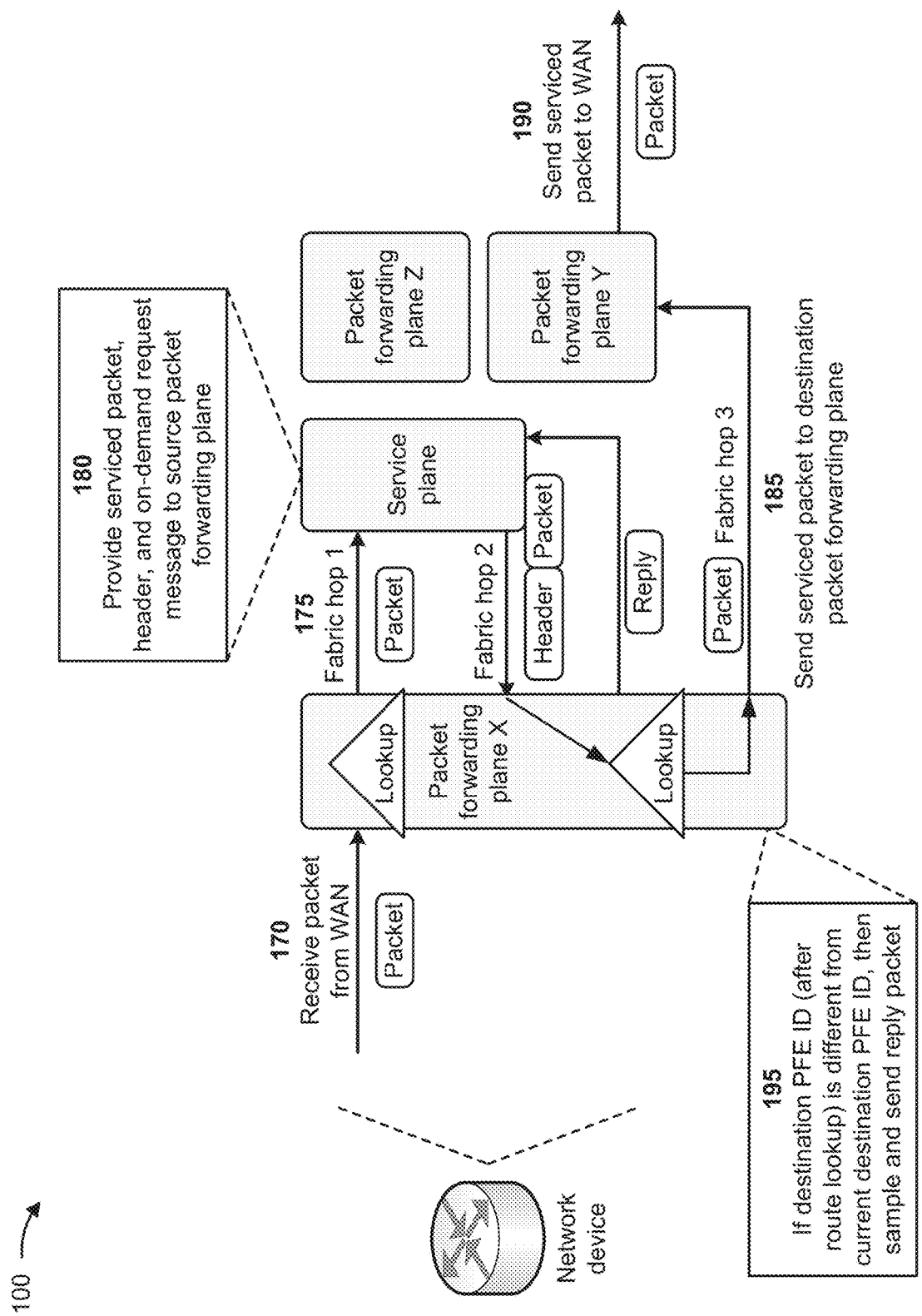
Figure 1F:
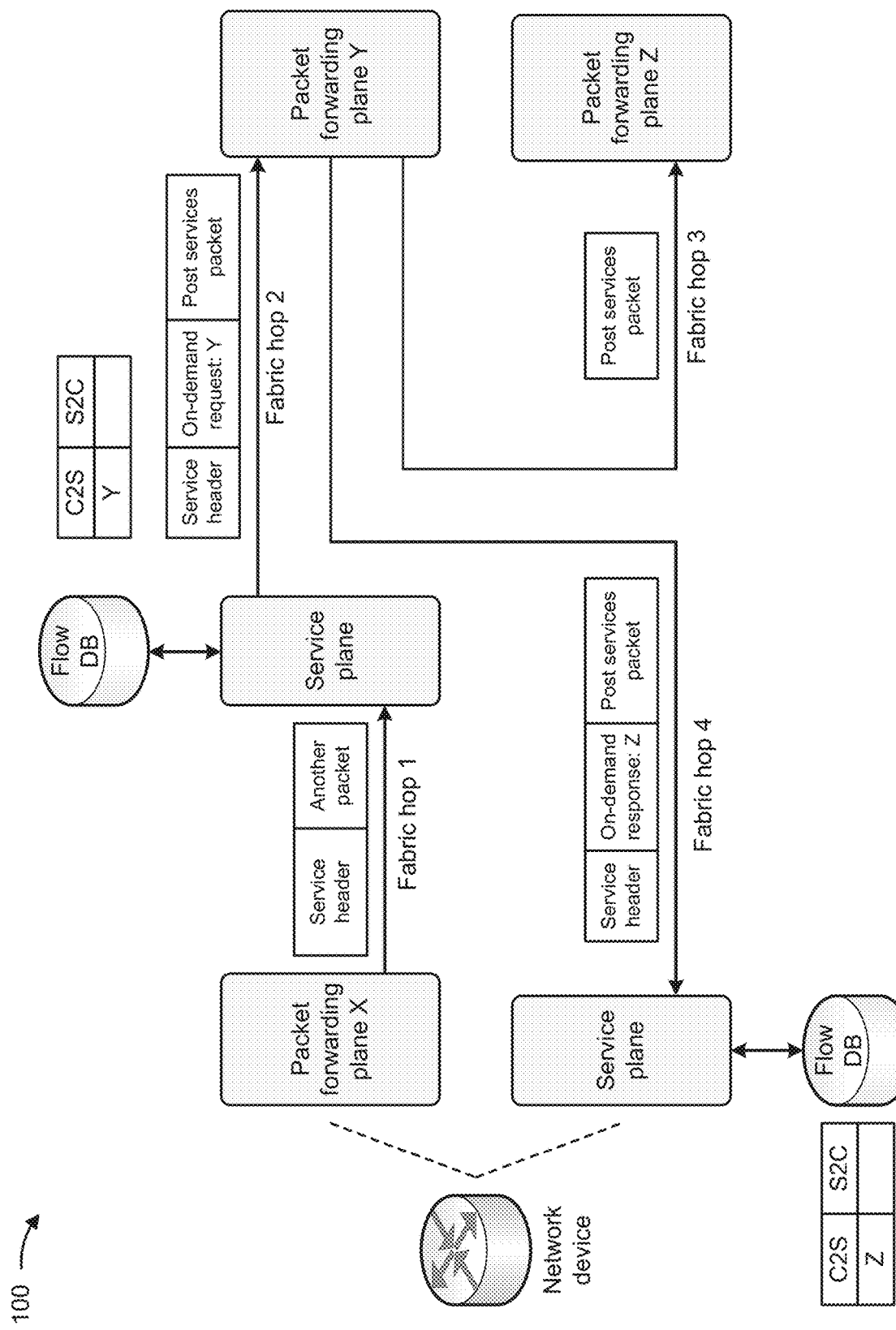

FIGS. 1E-1F are diagrams of an example implementation related to on-demand destination forwarding plane information learning. The service plane may receive updated destination packet forwarding plane forwarding plane information based on providing a feedback request message with a serviced packet, as described in greater detail below.

As shown in FIG. 1E, and by reference number 170, the first packet forwarding plane receives a packet from the WAN. The first packet forwarding plane may perform a route lookup operation based on receiving the packet. The first packet forwarding plane may determine to provide the packet to a service plane based on performing the route lookup information.

As shown by reference number 175, the first packet forwarding plane provides the packet to the service plane via the fabric plane. In some implementations, the first packet forwarding plane adds a header to the packet and provides the header and the packet to the service plane. The header may include information identifying the first packet forwarding plane as the source packet forwarding plane.

The service plane may receive the packet via the fabric plane. The service plane may apply a service to the packet to generate a serviced packet based on receiving the packet from the first packet forwarding plane. For example, the service plane may perform DPI, IPsec processing, and/or the like. In some implementations, the service plane monitors a session associated with the packet. The session may be associated with an uplink flow and a downlink flow. The service plane may create the uplink flow based on receiving the packet from the first packet forwarding plane.

The service plane may track a destination packet forwarding plane for each flow. The service plane may determine a source packet forwarding plane from which the packet is received (e.g., the first packet forwarding plane) based on creating the uplink flow (e.g., based on the packet being the first packet associated with the uplink flow that is received by the service plane). The service plane may determine the source packet forwarding plane based on information included in the header of the packet (e.g., information identifying the first packet forwarding plane). The service plane may identify the source packet forwarding plane as the current destination packet forwarding plane.

The service plane may store flow information associated with the packet in a data structure. For example, as shown in FIG. 1B, the service plane may store the flow information in a flow database. The flow information may include a session identifier, information identifying the uplink flow (e.g., a flow identifier), information identifying a current destination packet forwarding plane (e.g., a packet forwarding plane identifier (PFE ID) associated with the first packet forwarding plane), information identifying the service plane, and/or the like.

In some implementations, the service plane may generate a header associated with the packet. The header may include information identifying the service plane, information identifying the uplink flow, information identifying the current destination packet forwarding plane, and/or the like. The service plane may add the header to the serviced packet.

Alternatively, and/or additionally, the service plane may generate an on-demand request message associated with the serviced packet. In some implementations, the on-demand request message may be part of the header added to the serviced packet by the service plane, as described above. The on-demand request message may include information indicating that the first packet forwarding plane is to provide updated destination packet forwarding plane information if the current destination packet forwarding plane identified in the header is different from a destination packet forwarding plane determined by the first packet forwarding plane based on performing a route lookup operation. Additionally, the on-demand request message may include information identifying a flow associated with the serviced packet (e.g., the uplink flow), information identifying a session associated with the serviced packet (e.g., a session identifier), information associated with a CPU core associated with the service plane (e.g., a CPU core identifier), information identifying a tunnel associated with the serviced packet (e.g., a tunnel identifier), and/or the like.

As shown by reference number 180, the service plane provides the serviced packet, the header, and the on-demand request to the source packet forwarding plane (e.g., the first packet forwarding plane). The first packet forwarding plane may receive the serviced packet, the header, and the on-demand request message and may perform a route lookup operation. The first packet forwarding plane may determine a destination packet forwarding plane to which the service packet is to be provided based on performing the route lookup operation. In some implementations, the first packet forwarding plane may generate a header for the service packet that includes information identifying the destination packet forwarding plane determined based on performing the route lookup operation. The first packet forwarding plane may add the header to the serviced packet.

As shown by reference number 190, the first packet forwarding plane sends the serviced packet to the destination packet forwarding plane (e.g., packet forwarding plane Y, as shown in FIG. 1E). The first packet forwarding plane may send the serviced packet to the destination packet forwarding plane to cause the destination packet forwarding plane to forward the serviced packet towards a destination associated with the serviced packet. As shown by reference number 190, the destination packet forwarding plane sends the serviced packet to the WAN to forward the serviced packet towards the destination.

As shown by reference number 195, the first packet forwarding plane determines whether the destination packet forwarding plane, determined based on performing the route lookup operation, is different from the current destination packet forwarding plane identified in the header and, if so, samples the serviced packet and sends a reply packet to the CPU core associated with the service plane in response to the on-demand request message. The reply packet may include information identifying the destination packet forwarding plane determined based on performing the route lookup information (e.g., packet forwarding plane Y) as the current destination packet forwarding plane for the flow associated with the serviced packet.

In some implementations, the first packet forwarding plane samples the serviced packet by generating a copy of the serviced packet, including the header added by the first packet forwarding plane. In these implementations, the reply packet may include the copy of the serviced packet. The first packet forwarding plane may send the reply packet to the CPU core associated with the service plane. The CPU core may receive the reply packet and may cause the flow information for the serviced packet to be updated. For example, the CPU core may cause the flow information for the serviced packet stored in the flow database to be modified to indicate that the destination packet forwarding plane determined by the first packet forwarding plane is the current destination packet forwarding plane.

In implementations where the first packet forwarding plane determines that the current destination packet forwarding plane identified in the header of the serviced packet is the same as the destination packet forwarding plane determined based on performing the lookup operation, the first packet forwarding plane may determine not to send a reply packet to the CPU core associated with the service plane. In this way, the first packet forwarding plane may reduce a quantity of reply packets sent via the fabric plane and/or processed by the CPU core relative to sending a reply packet in response to each on-demand request received by the first packet forwarding plane. As such, the first packet forwarding plane may conserve computing resources that otherwise would have been utilized sending and/or processing the additional reply packets.

When another packet associated with the flow associated with the serviced packet is received by the first packet forwarding plane, the first packet forwarding plane may perform a route lookup operation, generate a header for the packet, and add the header to the packet in a manner similar to that described above. As shown in FIG. 1F, the first packet forwarding plane may forward the packet and the header to the service plane.

The service plane may receive the packet and may apply a service to the packet. The service plane may determine a flow associated with the packet based on the header in a manner similar to that described above. The service plane may determine a current destination packet forwarding plane associated with the packet based on the flow information stored in the data structure. For example, as shown in FIG. 1F, the service plane determines the packet forwarding plane Y as the current destination packet forwarding plane based on the flow information stored in the flow database.

The service plane may generate an on-demand request associated with the flow associated with the packet in a manner similar to that described above. In some implementations, the service plane generates the on-demand request based on determining an expiration of a time period (e.g., thirty seconds, one minute, and/or the like) from sending a previous on-demand request associated with the flow associated with the packet. Alternatively, and/or additionally, the service plane may generate the request based on applying the service to a particular quantity of packets associated with the flow.

As shown in FIG. 1F, the service plane sends the serviced packet, the header, and the on-demand request to the packet forwarding plane Y based on determining that the packet forwarding plane Y is the current destination packet forwarding plane associated with the flow associated with the packet. The packet forwarding plane Y may receive the serviced packet, the header, and the on-demand request from the service plane.

The packet forwarding plane Y may perform a lookup operation to determine a destination packet forwarding plane associated with the serviced packet. In some implementations, the destination packet forwarding plane for the flow associated with the serviced packet may change. For example, a link flap (e.g., a communication link alternates between up and down states) and/or a route change may occur, further processing may be required for packets associated with the flow, and/or the like. For example, as shown in FIG. 1F, the packet forwarding plane Y determines that the packet forwarding plane Z is the destination packet forwarding plane associated with the serviced packet. The packet forwarding plane Y may send a reply packet to the service plane indicating that the packet forwarding plane Z is the destination packet forwarding plane associated with the serviced packet based on the destination packet forwarding plane determined by performing the route lookup operation being different from the current destination packet forwarding plane identified in the header.

In some implementations, the reply packet includes a copy of the serviced packet. For example, the packet forwarding plane Y may generate a header for the serviced packet that includes information identifying packet forwarding plane Z. The packet forwarding plane Y may add the header to the serviced packet and may copy the serviced packet, including the added header, to generate the reply packet. The packet forwarding plane Y may send the serviced packet to the packet forwarding plane Z, and the packet forwarding plane Z may forward the serviced packet towards a destination associated with the serviced packet.

As shown in FIG. 1F, the packet forwarding plane Y may send the copy of the serviced packet, including the header, and the reply packet to the service plane. The service plane may process the reply packet and may determine that the destination packet forwarding plane determined by the packet forwarding plane Y is the packet forwarding plane Z. The service plane may update flow information associated with the flow associated with the serviced packet based on determining that the packet forwarding plane determined by the packet forwarding plane Y is the packet forwarding plane Z. The service plane may forward subsequent packets associated with the flow to the packet forwarding plane Z based on the updated flow information.

In this way, the network device may provide an on-demand destination next hop information sharing mechanism between a forwarding plane and a service plane. For example, the network device may learn packet forwarding plane information based on sending feedback request messages to a source packet forwarding plane of the network device. If a new destination packet forwarding plane is determined, information identifying the new destination packet forwarding plane may be provided to the service plane in a reply message. The service plane may utilize the information to provide subsequent packets associated with a same flow directly to the new destination packet forwarding plane thereby eliminating a fabric hop. This, in turn, conserves computing resources (e.g., processing resources, memory resources, communication resources, and/or the like), networking resources, and/or the like that would otherwise have been wasted in performing extra fabric hops with the network device, determining routes for serviced packets, and/or the like.

In some implementations, a service plane may maintain a separate database (e.g., a PFE-ID database) of all forward plane identifiers (e.g., PFE-ID). The PFE-ID database may comprise PFE-IDs of all the packet forwarding plane entities in the network device. The entries in the PFE-ID database may not have an association with the entries added to the flow database/data structure described above. Entries may be added to the PFE-ID database when a new forwarding plane entity is detected in the network device. The service plane may delete a PFE-ID from the PFE-ID database if a forwarding plane is determined to be crashing or failed. If a crashed or failed forwarding plane is determined as not live, the service plane may refrain from forwarding any serviced packets to the failed forwarding plane. The service plane may adopt a method to select an alternative forwarding plane, from the PFE-ID database, identified by the present entries in the PFE-ID database. In this way, the service plane is kept responsive to additions and removal/failures of forwarding plane entities in the network device.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
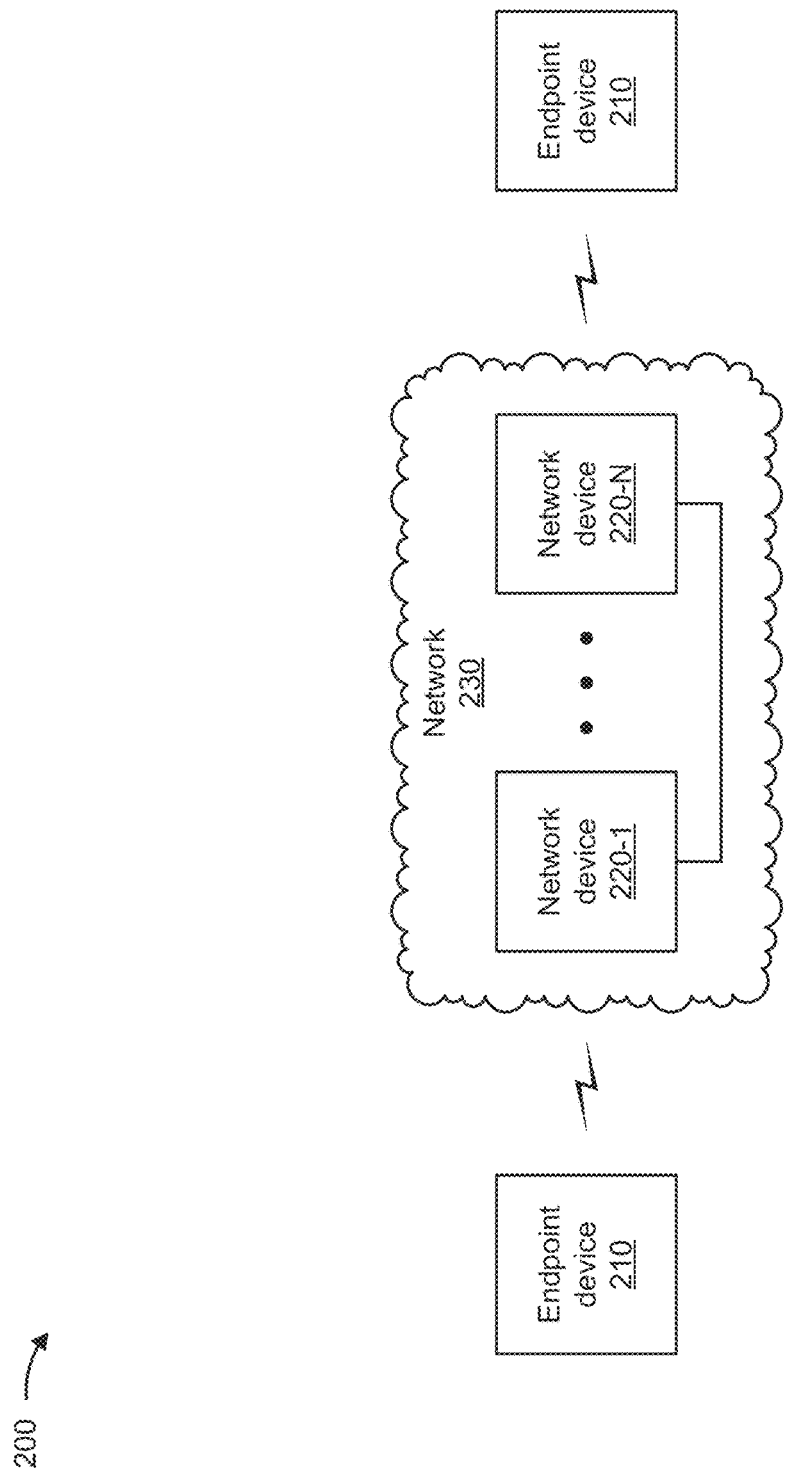
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a client device (e.g., a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, and/or the like), a server device (e.g., a proxy server, a cloud server, a data center server, and/or the like), and/or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
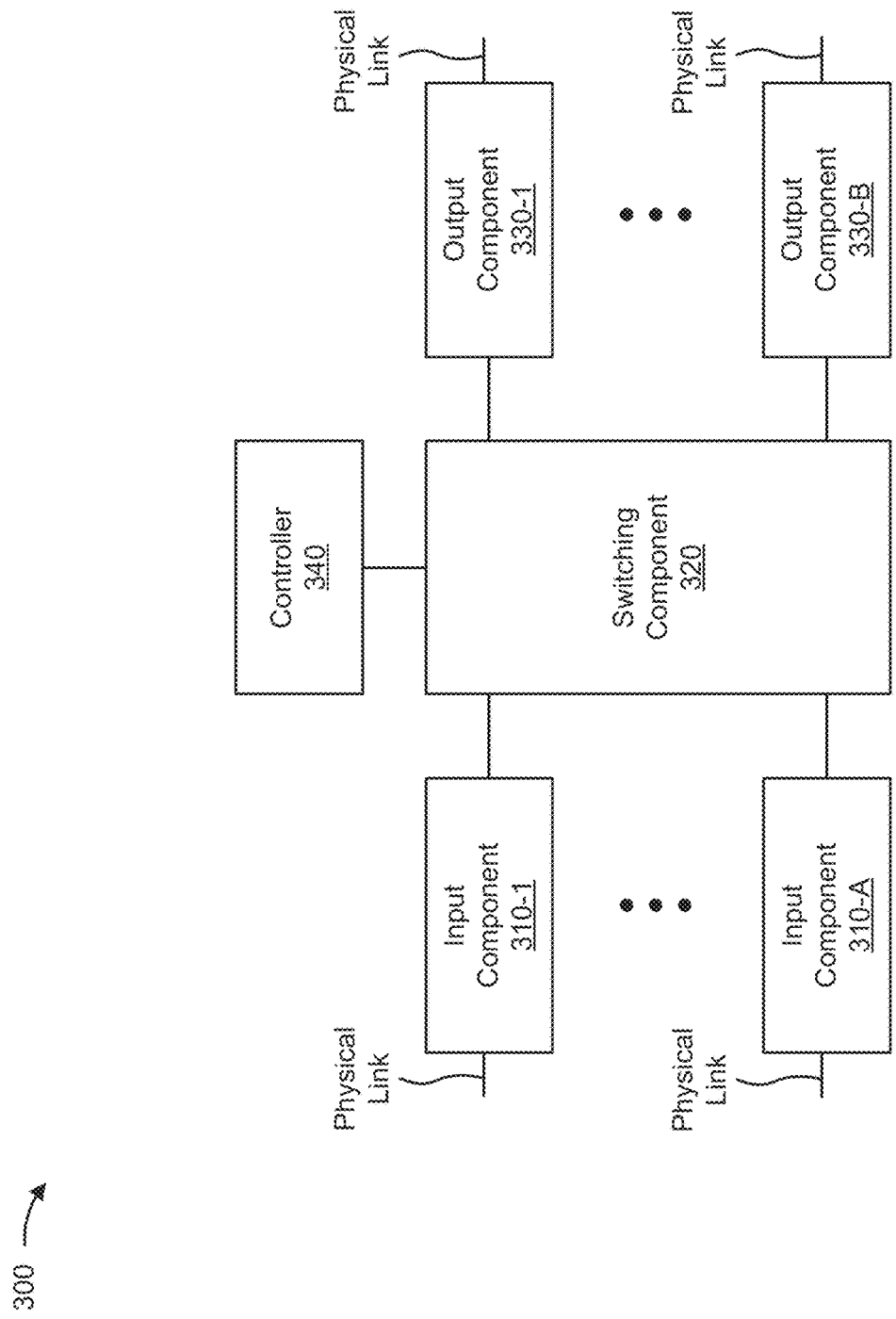
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C(C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
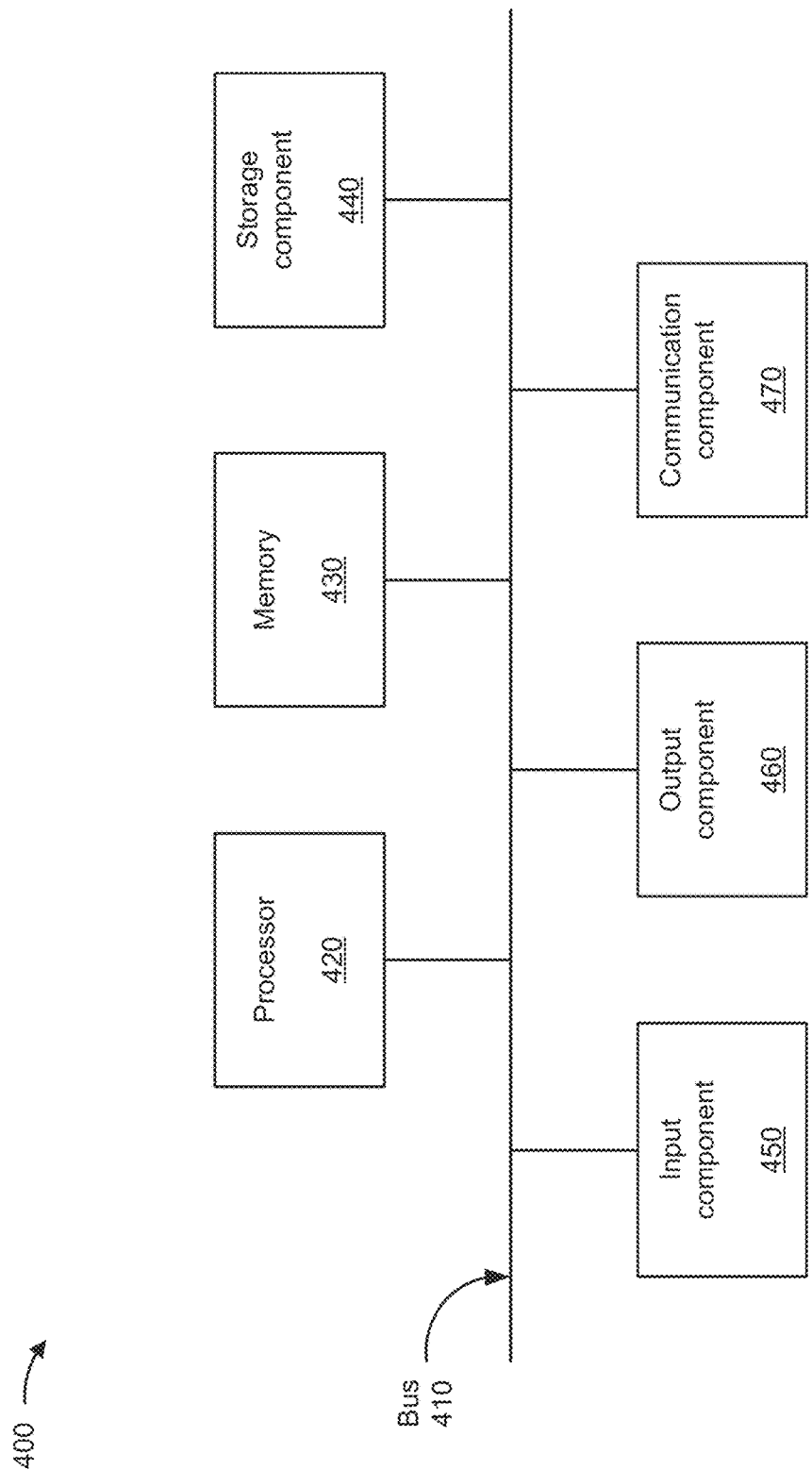

FIG. 4 is a diagram of example components of a device 400, which may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
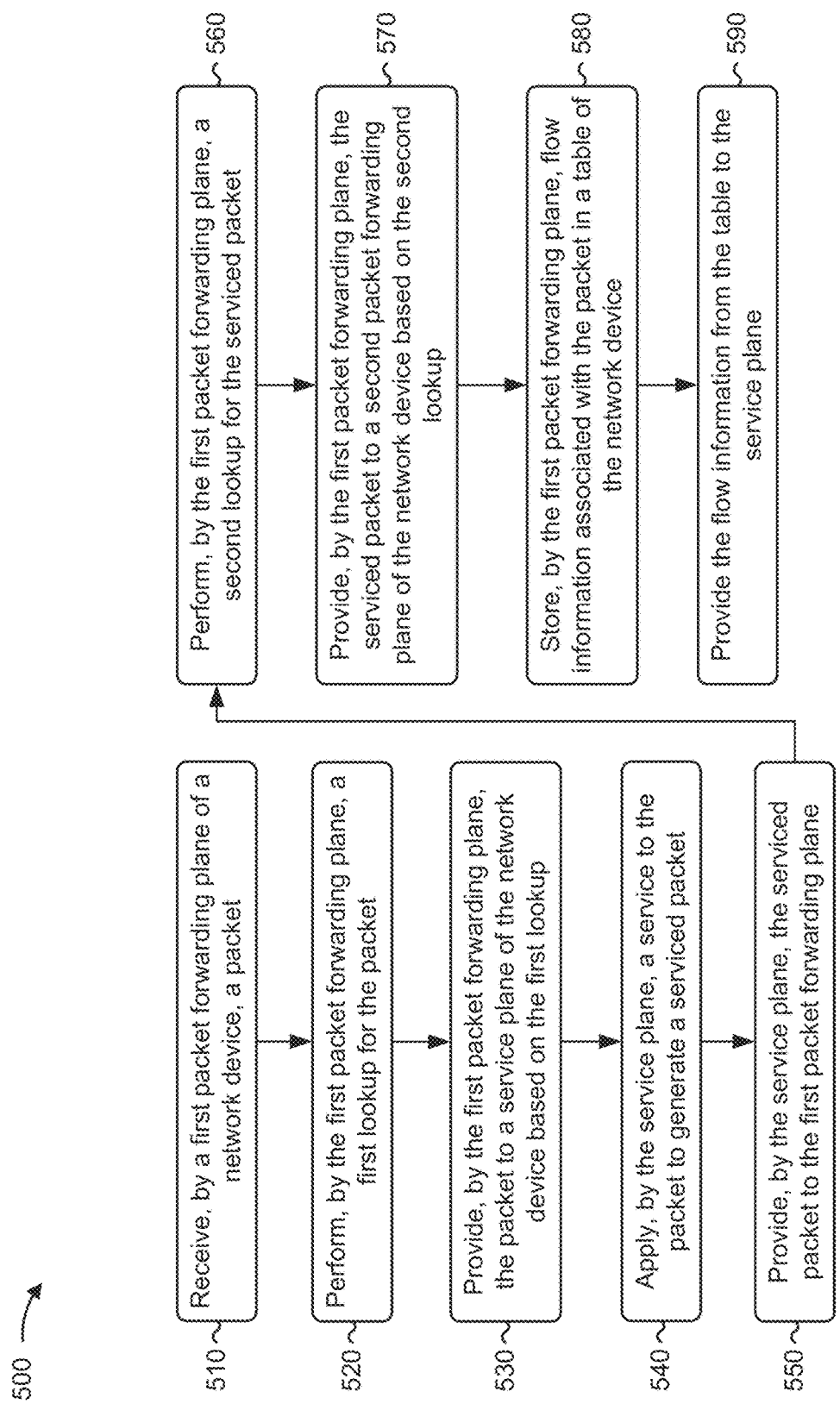
FIG. 5 is a flow chart of an example process associated with proactive and on-demand destination next hop information sharing mechanism between a forwarding plane and a service plane.

FIG. 5 is a flowchart of an example process 500 associated with providing a proactive and on-demand destination next hop information sharing mechanism between a forwarding plane and a service plane. In some implementations, one or more process blocks of FIG. 5 may be performed by a device (e.g., network device 220). In some implementations, one or more process blocks of FIG. 5 may be performed by another device or a group of devices separate from or including the device, such as an endpoint device (e.g., endpoint device 210). Additionally, or alternatively, one or more process blocks of FIG. 5 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 5, process 500 may include receiving, by a first packet forwarding plane, a packet (block 510). For example, a first packet forwarding plane of the network device may receive a packet, as described above.

As further shown in FIG. 5, process 500 may include performing, by the first packet forwarding plane, a first lookup for the packet (block 520). For example, the first packet forwarding plane of the network device may perform a first lookup for the packet, as described above.

As further shown in FIG. 5, process 500 may include providing, by the first packet forwarding plane, the packet to a service plane of the network device based on the first lookup (block 530). For example, the first packet forwarding plane of the network device may provide the packet to a service plane of the network device based on the first lookup, as described above. In some implementations, the first packet forwarding plane may add a header to the packet and may provide the packet and the header to the service plane.

As further shown in FIG. 5, process 500 may include applying, by the service plane, a service to the packet to generate a serviced packet (block 540). For example, the service plane of the network device may apply a service to the packet to generate a serviced packet, as described above. In some implementations, the service includes deep packet inspection or Internet protocol security.

As further shown in FIG. 5, process 500 may include providing, by the service plane, the serviced packet to the first packet forwarding plane (block 550). For example, the service plane of the network device may provide the serviced packet to the first packet forwarding plane, as described above. In some implementations, the service plane may add a header to the serviced packet and may provide the serviced packet and the header to the first packet forwarding plane. The header may include a feedback request message. The first packet forwarding plane may generate a reply to the feedback message. The reply may include new destination forwarding plane information. The first packet forwarding plane may provide the reply to the service plane.

In some implementations, the first packet forwarding plane may add a header to the packet and may provide the packet and the header to the service plane. In these implementations, the service plane may generate an on-demand request for the second packet forwarding plane. The service plane may provide the serviced packet, the header, and the on-demand request to the second packet forwarding plane. The second packet forwarding plane may provide the serviced packet to a third packet forwarding plane. The second packet forwarding plane may generate an on-demand response to the on-demand request. The on-demand response may identify the third packet forwarding plane. The second packet forwarding plane may provide the serviced packet, the header, and the on-demand response to the service plane.

As further shown in FIG. 5, process 500 may include performing, by the first packet forwarding plane, a second lookup for the serviced packet (block 560). For example, the first packet forwarding plane of the network device may perform a second lookup for the serviced packet, as described above.

As further shown in FIG. 5, process 500 may include providing, by the first packet forwarding plane, the serviced packet to a second packet forwarding plane of the network device based on the second lookup (block 570). For example, the first packet forwarding plane of the network device may provide the serviced packet to a second packet forwarding plane of the network device based on the second lookup, as described above. The second packet forwarding plane may transmit the serviced packet toward a destination associated with the serviced packet. For example, the second packet forwarding plane may transmit the serviced packet to a WAN associated with the network device.

As further shown in FIG. 5, process 500 may include storing, by the first packet forwarding plane, flow information associated with the packet in a table of the network device (block 580). For example, the first packet forwarding plane of the network device may store flow information associated with the packet in a table of the network device, as described above.

As further shown in FIG. 5, process 500 may include providing the flow information from the table to the service plane (block 590). For example, the network device may provide the flow information from the table to the service plane, as described above.

In some implementations, the first packet forwarding plane may receive another packet associated with the flow information. The first packet forwarding plane may perform a third lookup for the other packet. The first forwarding plane may forward the other packet to the service plane based on the third lookup. The service plane may apply another service to the other packet to generate another serviced packet and may provide the other serviced packet to the second packet forwarding plane based on the flow information. The second packet forwarding plane may transmit the other serviced packet toward a destination associated with the other serviced packet.

In some implementations, the first packet forwarding plane may receive a plurality of packets associated with the flow information. The first packet forwarding plane may store, in the table, session identifiers of the plurality of packets with the flow information. The first packet forwarding plane may generate a notification message that includes the session identifiers of the plurality of packets. The first packet forwarding plane may provide the notification message to the service plane.

In some implementations, the second packet forwarding plane may receive another packet associated with the flow information. The second packet forwarding plane may perform a third lookup for the other packet. The second packet forwarding plane may provide the other packet to the service plane based on the third lookup. The service plane may apply another service to the other packet to generate another serviced packet. The service plane may provide the other serviced packet to the first packet forwarding plane based on the flow information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
forwarding, by a first packet forwarding plane, and based on a first lookup associated with a first packet, the first packet to a service plane;
applying a first service to the first packet to generate a first serviced packet;
adding a header to the first serviced packet,
wherein the header includes a feedback request message associated with the first packet;
receiving, by the first packet forwarding plane, from the service plane, and based on forwarding the first packet, the first serviced packet;
generating a reply to the feedback request message;
transmitting, by the first packet forwarding plane, and to the service plane, the reply to the feedback request message,
wherein the reply includes information associated with a new destination forwarding plane;
storing flow information associated with the first packet in a table;
providing the flow information from the table to the service plane;
transmitting, by the first packet forwarding plane, and based on a second lookup associated with the first serviced packet, the first serviced packet to a second packet forwarding plane;
providing, by the first packet forwarding plane, and to the service plane, flow information associated with the first packet;
forwarding, by the first packet forwarding plane, and based on a third lookup associated with a second packet associated with the flow information, the second packet to the service plane; and
applying a second service to the second packet to generate a second serviced packet,
wherein the second serviced packet is forwarded to the second packet forwarding plane based on the flow information.

2. The method of claim 1, wherein the first service includes at least one of deep packet inspection or Internet protocol security.

3. The method of claim 1, further comprising:
receiving a plurality of third packets associated with the flow information;
storing session identifiers associated with the plurality of third packets; and
providing, to the service plane, the session identifiers.

4. The method of claim 1, further comprising:
generating an on-demand request that includes information indicating that the first packet forwarding plane is to provide updated destination packet forwarding plane information if the first packet forwarding plane identified in a header of the first packet is different from a destination packet forwarding plane determined based on performing a route lookup operation that includes the first lookup, the second lookup, or the third lookup.

5. The method of claim 1, wherein the first packet is forwarded to the service plane via a fabric plane.

6. The method of claim 1, wherein the first service packet is transmitted to the second packet forwarding plane via a fabric plane.

7. The method of claim 1, wherein the second serviced packet is forwarded to the second packet forwarding plane via a fabric plane.

8. A first packet forwarding plane, comprising:
one or more memories; and
one or more processors to:
forward, based on a first lookup associated with a first packet, the first packet to a service plane;
apply a first service to the first packet to generate a first serviced packet;
add a header to the first serviced packet,
wherein the header includes a feedback request message associated with the first packet;
receive, from the service plane, and based on forwarding the first packet, the first serviced packet;
generate a reply to the feedback request message;
transmit, to the service plane, the reply to the feedback request message,
wherein the reply includes information associated with a new destination forwarding plane;
store flow information associated with the first packet in a table;
provide the flow information from the table to the service plane;
transmit, based on a second lookup associated with the first serviced packet, the first serviced packet to a second packet forwarding plane;
provide, to the service plane, the flow information associated with the first packet;
forward, based on a third lookup associated with a second packet associated with the flow information, the second packet to the service plane; and
apply a second service to the second packet to generate a second serviced packet,
wherein the second serviced packet, is forwarded to the second packet forwarding plane based on the flow information.

9. The first packet forwarding plane of claim 8, wherein the first service includes at least one of deep packet inspection or Internet protocol security.

10. The first packet forwarding plane of claim 8, wherein the one or more processors are further to:
receive a plurality of third packets associated with the flow information;
store session identifiers associated with the plurality of third packets; and
provide, to the service plane, the session identifiers.

11. The first packet forwarding plane of claim 8, wherein the one or more processors are further to:
generate an on-demand request that includes information indicating that the first packet forwarding plane is to provide updated destination packet forwarding plane information if a current destination packet forwarding plane identified in a header of the first packet is different from a destination packet forwarding plane determined based on performing a route lookup operation that includes the first lookup, the second lookup, or the third lookup.

12. The first packet forwarding plane of claim 8, wherein the first packet is forwarded to the service plane via a fabric plane.

13. The first packet forwarding plane of claim 8, wherein the first service packet is transmitted to the second packet forwarding plane via a fabric plane.

14. The first packet forwarding plane of claim 8, wherein the second serviced packet is forwarded to the second packet forwarding plane via a fabric plane.

15. A non-transitory computer-readable medium storing a set of instructions, the set of instructions comprising:
one or more instructions that, when executed by one or more processors of a first packet forwarding plane, cause the first packet forwarding plane to:
forward, based on a first lookup associated with a first packet, the first packet to a service plane;
apply a first service to the first packet to generate a first serviced packet;
add a header to the first serviced packet,
wherein the header includes a feedback request message associated with the first packet;
receive from the service plane, based on forwarding the first packet, the first serviced packet;
generate a reply to the feedback request message;
transmit and to the service plane, the reply to the feedback request message,
wherein the reply includes information associated with a new destination forwarding plane;
store flow information associated with the first packet in a table;
provide the flow information from the table to the service plane;
transmit and based on a second lookup associated with the first serviced packet, the first serviced packet to a second packet forwarding plane;
provide and to the service plane, flow information associated with the first packet;
forward and based on a third lookup associated with a second packet associated with the flow information, the second packet to the service plane; and
apply a second service to the second packet to generate a second serviced packet,
wherein the second serviced packet is forwarded to the second packet forwarding plane based on the flow information.

16. The non-transitory computer-readable medium of claim 15, wherein the first service includes at least one of deep packet inspection or Internet protocol security.

17. The non-transitory computer-readable medium of claim 15, wherein the one or more instructions further cause the first packet forwarding plane to:
receive a plurality of third packets associated with the flow information;
store session identifiers associated with the plurality of third packets; and
provide, to the service plane, the session identifiers.

18. The non-transitory computer-readable medium of claim 15, wherein the first packet is forwarded to the service plane via a fabric plane.

19. The non-transitory computer-readable medium of claim 15, wherein the first service packet is transmitted to the second packet forwarding plane via a fabric plane.

20. The non-transitory computer-readable medium of claim 15, wherein the second serviced packet is forwarded to the second packet forwarding plane via a fabric plane.

* * * * *